United States Patent
Hu

(10) Patent No.: US 9,614,468 B2
(45) Date of Patent: Apr. 4, 2017

(54) INTERMEDIATE CONNECTING DEVICES AND ELECTRONICALLY COMMUTATED MOTORS FOR HVAC SYSTEMS

(71) Applicant: Zhongshan Broad-Ocean Motor Co., Ltd., Zhongshan (CN)

(72) Inventor: Ge Hu, Sugar Land, TX (US)

(73) Assignee: ZHONGSHAN BROAD-OCEAN MOTOR CO., LTD. (CN)

( * ) Notice: Subject to any disclaimer, the term of this patent is extended or adjusted under 35 U.S.C. 154(b) by 152 days.

(21) Appl. No.: 14/394,441

(22) PCT Filed: May 13, 2014

(86) PCT No.: PCT/CN2014/077346
§ 371 (c)(1),
(2) Date: Oct. 14, 2014

(87) PCT Pub. No.: WO2015/165129
PCT Pub. Date: Nov. 5, 2015

(65) Prior Publication Data
US 2016/0268935 A1 Sep. 15, 2016

(30) Foreign Application Priority Data
Apr. 30, 2014 (CN) .......................... 2014 1 0182987

(51) Int. Cl.
*H02P 1/04* (2006.01)
*H02P 6/08* (2016.01)
*H01R 31/06* (2006.01)

(52) U.S. Cl.
CPC ............... *H02P 6/08* (2013.01); *H01R 31/06* (2013.01)

(58) Field of Classification Search
CPC .. F24F 11/0079; F24F 11/0009; F24F 11/006; F24F 11/0012; F24F 11/001;
(Continued)

(56) References Cited

U.S. PATENT DOCUMENTS 4,922,169 A * 5/1990 Freeman .................. H02P 6/22
318/400.1
5,220,255 A * 6/1993 Alford ................. F24F 11/0009
236/74 A
(Continued)

FOREIGN PATENT DOCUMENTS

CN 101764551 A 6/2010
CN 201220315968.X * 6/2012
(Continued)

*Primary Examiner* — Paul Ip
(74) *Attorney, Agent, or Firm* — Norton Rose Fulbright US LLP

(57) ABSTRACT

Intermediate connecting devices and electronically commutated (ECM) motors for HVAC systems are disclosed, as well as methods for their use within the HVAC systems. An interface component device coupled to a system controller and an ECM motor may be configured to receive a first and second signal, and convert the voltage across the received signals to a lower-value voltage signal compatible with the ECM motor. The converted voltage signal may be transmitted to the ECM motor to cause the motor to operate in one of a plurality of operation modes. An ECM motor that includes a tap detection circuit and a processor may be configured to receive a voltage signal from the interface component and detect at which input port the voltage signal is received. The ECM motor may select the operation mode for the motor based on the detection of which input port received the voltage signal.

24 Claims, 12 Drawing Sheets

(58) Field of Classification Search
CPC .................. F24F 11/04; F24F 11/0086; F24F 2011/0068; F24F 2011/0046; F24F 2011/0061; F24F 2011/0064; F24F 2011/0072; F24F 13/0209
USPC ....... 318/400.09, 400.1, 400.08, 400.12, 480
See application file for complete search history.

(56) References Cited

U.S. PATENT DOCUMENTS

| | | | | |
|---|---|---|---|---|
| 5,397,970 | A * | 3/1995 | Rowlette | F24F 11/0009 318/400.09 |
| 5,492,273 | A * | 2/1996 | Shah | F24F 11/0009 236/11 |
| 5,592,058 | A * | 1/1997 | Archer | F24F 11/0009 318/400.08 |
| 6,369,536 | B2 * | 4/2002 | Beifus | H02P 6/08 318/400.12 |
| 6,851,621 | B1 * | 2/2005 | Wacker | F24F 11/0086 165/11.1 |
| 7,055,759 | B2 * | 6/2006 | Wacker | F24F 11/0086 165/201 |
| 7,083,109 | B2 * | 8/2006 | Pouchak | G05D 23/1905 236/1 E |
| 7,106,019 | B2 * | 9/2006 | Becerra | H02P 6/34 318/400.01 |
| 7,222,800 | B2 * | 5/2007 | Wruck | C09D 5/4492 165/11.1 |
| 7,535,186 | B2 * | 5/2009 | Beifus | G05B 19/0423 318/34 |
| 7,565,813 | B2 * | 7/2009 | Pouchak | G05D 23/1905 236/44 C |
| 7,795,827 | B2 * | 9/2010 | Jeung | H02P 6/085 235/454 |
| 7,812,556 | B2 * | 10/2010 | Jeung | H02P 6/085 235/454 |
| 7,843,157 | B2 * | 11/2010 | Archer | H02P 6/34 318/504 |
| 8,043,828 | B2 * | 10/2011 | Bodie | C11D 3/38645 435/18 |
| 8,049,447 | B2 * | 11/2011 | Jeung | H02P 6/085 318/400.04 |
| 8,072,167 | B2 * | 12/2011 | Jeung | H02P 6/085 235/454 |
| 8,143,828 | B2 * | 3/2012 | Becerra | F24F 11/006 236/51 |
| 8,362,725 | B2 * | 1/2013 | Becerra | F24F 11/006 236/51 |
| 8,493,008 | B2 * | 7/2013 | Merkel | F24F 11/0079 236/51 |
| 8,598,833 | B2 * | 12/2013 | Jeung | H05K 9/0058 318/400.24 |
| 8,766,573 | B2 * | 7/2014 | Becerra | F24F 11/006 236/51 |
| 8,803,387 | B2 * | 8/2014 | Kreidler | H02K 11/33 310/68 R |
| 8,896,248 | B2 * | 11/2014 | Becerra | H02P 25/188 318/400.01 |
| 9,369,070 | B2 * | 6/2016 | Hu | H02P 6/08 |
| 2002/0117986 | A1 * | 8/2002 | Becerra | H02P 6/34 318/480 |
| 2005/0040247 | A1 * | 2/2005 | Pouchak | G05D 23/1905 236/44 C |
| 2005/0040248 | A1 * | 2/2005 | Wacker | F24F 11/0086 236/51 |
| 2005/0040249 | A1 * | 2/2005 | Wacker | F24F 11/0086 236/51 |
| 2005/0040250 | A1 * | 2/2005 | Wruck | C09D 5/4492 236/51 |
| 2007/0114291 | A1 * | 5/2007 | Pouchak | G05D 23/1905 236/44 C |
| 2007/0194728 | A1 * | 8/2007 | Beifus | G05B 19/0423 318/66 |
| 2007/0205732 | A1 * | 9/2007 | Beifus | H02P 6/34 318/432 |
| 2008/0122392 | A1 * | 5/2008 | Archer | H02P 6/34 318/504 |
| 2009/0218968 | A1 * | 9/2009 | Jeung | H02P 6/085 318/400.04 |
| 2009/0218971 | A1 * | 9/2009 | Jeung | H02P 6/085 318/400.17 |
| 2009/0224709 | A1 * | 9/2009 | Jeung | H02P 6/085 318/400.13 |
| 2010/0033119 | A1 * | 2/2010 | Becerra | F24F 11/006 318/400.09 |
| 2010/0052592 | A1 * | 3/2010 | Shahi | G05B 19/414 318/558 |
| 2010/0211224 | A1 * | 8/2010 | Keeling | F24D 19/1066 700/277 |
| 2011/0025245 | A1 * | 2/2011 | Jeung | H02P 6/085 318/400.26 |
| 2011/0140644 | A1 * | 6/2011 | Jeung | H05K 9/0058 318/400.24 |
| 2011/0260671 | A1 * | 10/2011 | Jeung | H02P 6/08 318/701 |
| 2012/0161682 | A1 * | 6/2012 | Becerra | F24F 11/006 318/452 |
| 2012/0212166 | A1 * | 8/2012 | Merkel | F24F 11/0079 318/400.08 |
| 2012/0229064 | A1 * | 9/2012 | Jeung | H02P 6/085 318/400.13 |
| 2013/0103206 | A1 * | 4/2013 | Becerra | F24F 11/006 700/276 |
| 2013/0214651 | A1 * | 8/2013 | Kreidler | H02K 11/33 310/68 R |
| 2013/0231793 | A1 * | 9/2013 | Elliott | G05B 15/02 700/292 |
| 2014/0257576 | A1 * | 9/2014 | Becerra | F24F 11/006 700/276 |
| 2014/0265957 | A1 * | 9/2014 | Hu | H02P 6/08 318/400.15 |
| 2014/0328705 | A1 * | 11/2014 | Lu | F04D 27/004 417/410.1 |

FOREIGN PATENT DOCUMENTS

| | | | |
|---|---|---|---|
| CN | 201310082334.3 | * | 3/2013 |
| CN | 201310422664.2 | * | 9/2013 |
| CN | 103338005 A | | 10/2013 |
| WO | 02013/134982 A1 | * | 9/2013 |

* cited by examiner

INTERMEDIATE CONNECTING DEVICES AND ELECTRONICALLY COMMUTATED MOTORS FOR HVAC SYSTEMS

CROSS-REFERENCE TO RELATED APPLICATIONS

This is a national stage application of PCT/CN2014/077346 filed on May 13, 2014 claiming priority to CN 201410182987.3 filed on Apr. 30, 2014 in China.

TECHNICAL FIELD

The present disclosure relates to an HVAC system and an intermediate connection device for use in the HVAC system.

BACKGROUND

As competition in the field of electric appliances has become increasingly fierce over recent years, more demanding technical requirements are being posed on products. For example, products are now required to be energy saving and environmentally friendly, and have a high degree of controllable intelligence, a short development period, and low noise. Electric motors, as the core part, have undoubtedly become a key part to solving the above-mentioned technical problems. Motors in conventional household central air conditioners are typically single phase permanent-split capacitor AC motors (PSC). However, single phase AC motors have low efficiency, consume more energy, have high noise, and have a low degree of controllable intelligence.

As a result of advances in motor technologies, permanent magnet (PM) synchronous motors have been developed. PM synchronous motors typically have a motor controller to electronically commutate current. As a result, PM synchronous motors are also referred to as electronically commutated (ECM) motors. PM synchronous motors are characterized in that they are energy saving and environmentally friendly, they have relatively high reliability and controllability, generate low noise, are easily made more intelligent, and can address the drawbacks of single phase AC motors. Therefore, the single phase AC motors in conventional household central air conditioners are gradually being replaced by PM synchronous motors. However, circuit ports are quite different for single phase AC motors and PM synchronous motors, which creates a problem because it is difficult for one motor to have two different circuit ports. When a conventional PM synchronous motor is used to replace the single phase AC motor in an existing household central air conditioner, it is necessary to replace the circuit port of the motor, change the motor circuit, etc., making the replacement inconvenient and costly.

In view of the foregoing drawbacks, ECM motors have been developed to directly replace the original PSC motors without the need to change the circuit structure of the original application systems of the PSC motors, e.g., the HVAC control system. The installation and troubleshooting of ECM motors in HVAC systems is simple, and the development cost associated with an ECM motor is lower than that of a PSC motor.

However, current ECM motors used to replace single phase AC motors still have numerous problems. For example, ECM motors have single functions and cannot be used under different circumstances. In addition, with an ECM motor driven by a THERMOSTAT, as shown in FIG. 1, the output ports W1, W2, Y1, Y2, and G of the THERMOSTAT output 24 V AC signals to the five tap lines T1, T2, T3, T4 and T5 of the ECM motor while the HVAC system that originally included the PSC fan motor outputs 115 V AC or 230 V AC signals. The two outputs are not compatible.

SUMMARY

There is a need to develop a solution to expand the application range of existing ECM motors for HVAC systems to avoid repeated development, lower the R&D cost, shorten R&D period, and facilitate management. An object of the present disclosure is to provide an HVAC system in which an ECM motor takes the place of the PSC fan motor in the HVAC system. As the tap input signals used by the ECM motor are 24 V AC, a simple installation and connection through an intermediate connection device can match the output high-voltage control signals of the HVAC system with the 24 V AC tap input signals of the ECM motor, which avoids repeated development, lowers the R&D cost, shortens R&D period, minimizes product models, and facilitates management.

Another object of the present disclosure is to provide an intermediate connection device, through which the output high-voltage control signals of an HVAC system can match with the 24 V AC tap input signals of an ECM motor. The structure may be simple, which avoids repeated development of an ECM motor, lowers the R&D cost, shortens R&D period, minimizes product models, and facilitates management.

The present disclosure achieves the above objects through the technical solutions described herein. One embodiment includes an HVAC system, wherein the HVAC system originally used a PSC fan motor, and wherein the HVAC system comprises an HVAC system controller and an ECM motor which has replaced the PSC fan motor. The HVAC system controller may include several output ports connected to the motor and two AC input ports, wherein one AC input port may be connected to the output ports, respectively, via several relays in the HVAC system, and one of the several output ports is for 115 V or 230 V AC signals to pass. According to an embodiment, the ECM motor may be provided with several tap input lines, wherein only one of the tap input lines is selected to be in the on state, and the remaining lines are selected to be in the off state without electricity. The ECM motor may select an operational parameter for the motor based on the tap input line that is selected to be in the on state and may control the motor to run according to the selected operational parameter. The tap input lines may be switched on using 24 V low-voltage AC signals. In addition, the HVAC system may further comprise an intermediate connection device, wherein the intermediate connection device may be connected between the HVAC system controller and the ECM motor, and wherein the intermediate connection device converts the 115 V or 230 V AC signals at the several output ports of the HVAC system controller to the 24 V low-voltage AC signals that can be identified by the several tap input lines of the ECM motor.

In another embodiment, the intermediate connection device may include several relays, wherein one wiring terminal of the induction coil of each relay may be connected to one of the several output ports of the HVAC system, and the other wiring terminal of the induction coil of each relay may be connected in parallel for connection with the other AC input port of the HVAC system. One wiring terminal of the switch of each relay may be connected to one tap input line of the ECM motor, and the other wiring terminal of the switch of each relay may be connected in parallel for connection with the 24 V low-voltage AC signals.

In an embodiment, the intermediate connection device may include a control circuit board, wherein the control circuit board is provided with several opto-coupler isolation units. The two input terminals of each opto-coupler isolation unit may be connected to one output port of the HVAC system and the other AC input port of the HVAC system, respectively. One output terminal of each opto-coupler isolation unit may be connected to the 24 V low-voltage AC signals, and the other output of each opto-coupler isolation unit may be connected to one tap input of the ECM motor.

According to an embodiment, the ECM motor may include a motor and a motor controller, wherein the motor controller may include a control box and a control circuit board installed in the control box. The control circuit board may be integrated with a microprocessor, an inverter circuit, a tap detection circuit, and a power source portion, wherein the power source portion may be connected to an external AC power source input, and the output terminal of the power source portion may supply power to all circuits. The tap detection circuit may be connected to several tap input lines, wherein only one tap input line may be selected to be in the on state, and the remaining lines may be selected to be in the off state without electricity. The tap detection circuit may include several current sensing units, and each tap input line may be connected to the first input terminal of one current sensing unit, respectively, while the output terminal of the current sensing unit may be connected to the input terminal of the microprocessor. The microprocessor may select an operational parameter for the motor based on the detected on state signal of each tap input line and may control the motor to run according to the selected operational parameter, and the current sensing units may detect the 24 V low-voltage AC signals of several tap input lines.

In yet another embodiment, the HVAC system controller may include four output ports connected to the motor, wherein several relays may refer to four relays, and each relay may be connected into a socket via wires. The socket may include several independent plug holes, wherein the plug holes may be installed with wiring terminals, and the wiring terminals may be connected to one end of the wires.

According to an embodiment, one terminal in the above socket may be connected to the end of a wire, and the other end of the wire may be connected to 24 V AC. According to an embodiment, three terminals in the socket may be connected to two output terminals and the ground terminal of the power source in the HVAC system via three wires. The socket may have two rows, upper and lower, of plug holes and each row may have five plug holes.

In some embodiments, the HVAC system controller may include four output ports connected to the motor, wherein the control circuit board may be provided with several opto-coupler isolation units. Each opto-coupler isolation unit may be connected into the socket via wires. The socket may include several independent plug holes, wherein the plug holes may be installed with wiring terminals, and the wiring terminals may be connected to one end of the wires. One terminal in the socket may be connected to the end of a wire, and the other end of the wire may be connected to 24 V AC. Three terminals in the socket may be connected to two output terminals and the ground terminal of the power source in the HVAC system via three wires. The socket may have two rows, upper and lower, of plug holes and each row may have five plug holes.

In another embodiment, an intermediate connection device for the HVAC system may include a connection socket, connection wires, connection terminals and several relays, wherein the connection wires may include power source wires, relay first connection wires, relay second connection wires, a 24 V AC power source wire, and a ground wire. The connection socket may be provided with several plug holes thereon, and wiring terminals may be installed in the plug holes. Some of the wiring terminals may be connected to the power source wires, respectively, while some of the wiring terminals may be connected to one end of the relay first connection wire. The other end of the relay first connection wire may be connected to one wiring terminal of the switch of the relay, and the other wiring terminal of the switch of the relay may be connected to one end of the relay second connection wire. One wiring terminal may be connected to one end of the 24 V AC power source wire, and one wiring terminal may be connected to one end of the ground wire.

In some embodiments, the connection wires may further include relay third connection wires and relay fourth connection wires, wherein one end of the relay third connection wire may be connected to one wiring terminal of the induction coil of the relay, and one end of the relay fourth connection wire may be connected to another wiring terminal of the induction coil of the relay. The above connection socket may have a structure of two rows, upper and lower, of plug holes and each row may have five plug holes, wherein several relays mean four relays. In one embodiment, there may be four relay first connection wires, four relay second connection wires, and two power source wires.

In some embodiments, an intermediate connection device for the HVAC system may include a connection socket, connection wires, connection terminals and a control circuit board. The control circuit board may be provided with several opto-coupler isolation units, wherein the connection wires include power source wires, opto-coupler first connection wires, opto-coupler second connection wires, a 24 V AC power source wire, and a ground wire. The connection socket may be provided with several plug holes thereon, and wiring terminals may be installed in the plug holes. Some of the wiring terminals may be connected to the power source wires, respectively, while some of the wiring terminals may be connected to one end of the opto-coupler first connection wire. The other end of the opto-coupler first connection wire may be connected to one output terminal of the opto-coupler isolation unit. The other output terminal of the opto-coupler isolation unit may be connected to one end of the opto-coupler second connection wire. One wiring terminal may be connected to one end of the 24 V AC power source wire, and one wiring terminal may be connected to one end of the ground wire.

According to an embodiment, the connection wires may further include opto-coupler third connection wires and opto-coupler fourth connection wires. One end of the opto-coupler third connection wire may be connected to one input terminal of the opto-coupler isolation unit, and one end of the opto-coupler fourth connection wire may be connected to another input terminal of the opto-coupler isolation unit. The connection socket may have a structure of two rows, upper and lower, of plug holes and each row may have five plug holes, wherein several opto-coupler isolation units means four opto-coupler isolation units. There may be four opto-coupler first connection wires, four opto-coupler second connection wires, and two power source wires.

Compared with the prior art, the present utility model has significant effects. 1) The HVAC system according to the present disclosure may use an ECM motor to replace the PSC fan motor of the HVAC system. As the tap input signals used by the ECM motor are 24 V AC, a simple installation and connection through an intermediate connection device can match the output high-voltage control signals of the HVAC system with the 24 V AC tap input signals of the ECM motor, which avoids repeated development, lowers the R&D cost, shortens R&D period, minimizes product models and facilitates management. 2) The intermediate connection device may include several relays, wherein one wiring terminal of the induction coil of each relay may be connected to one of the several output ports of the HVAC system, and the other wiring terminal of the induction coil of each relay may be connected in parallel for connection with the other AC input port of the HVAC system. One wiring terminal of the switch of each relay may be connected to one tap input line of the ECM motor, and the other wiring terminal of the switch of each relay may be connected in parallel for connection with the 24 V low-voltage AC signals. The structure may be simple and easy to implement. 3) The intermediate connection device may include a connection socket, connection wires, connection terminals and a control circuit board, wherein the control circuit board may be provided with several opto-coupler isolation units. The resulting structure may be simple and easy to implement. In addition, the size may be small and the cost low.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION OF THE INVENTION

Example 1

Figure 1:
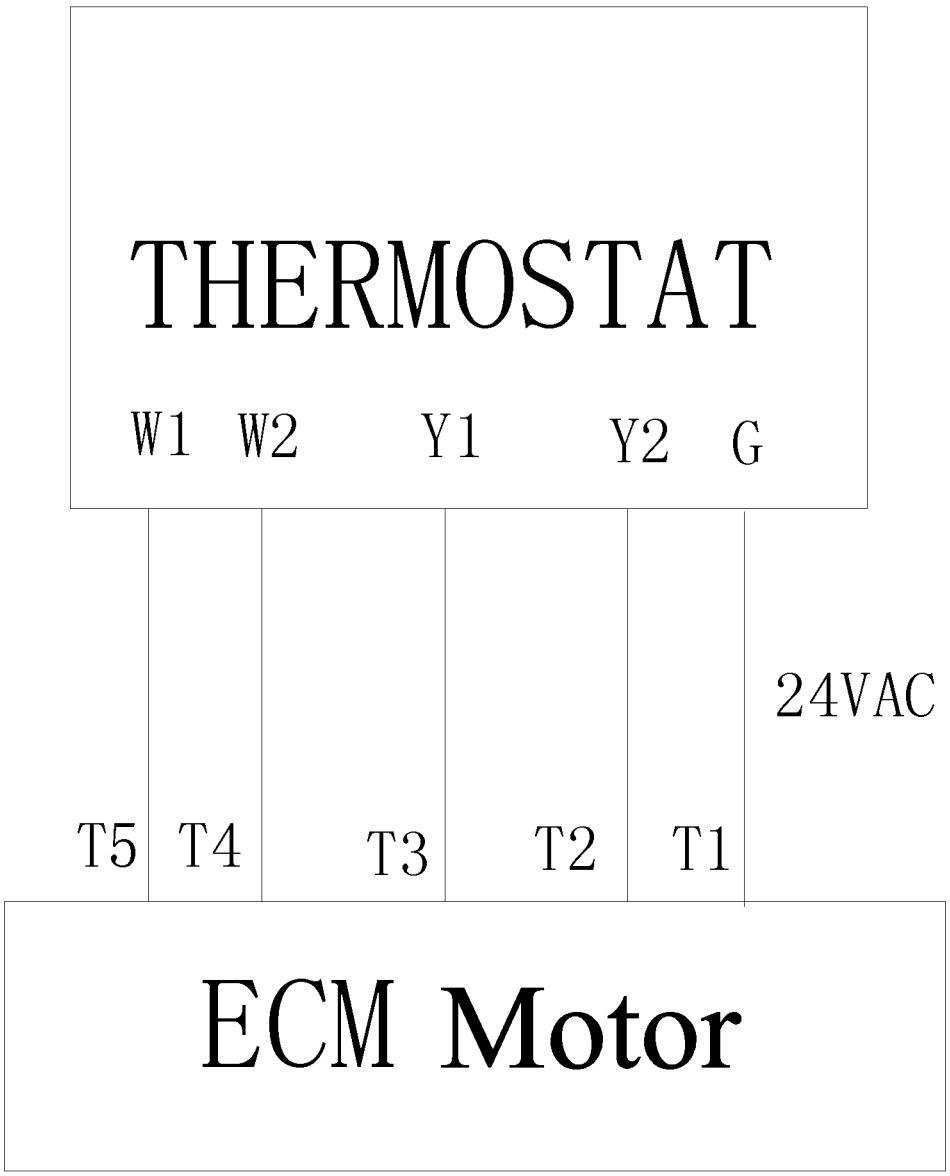
FIG. 1 is a schematic block diagram illustrating the connection between a thermostat and an ECM motor according to the prior art.
Figure 2:
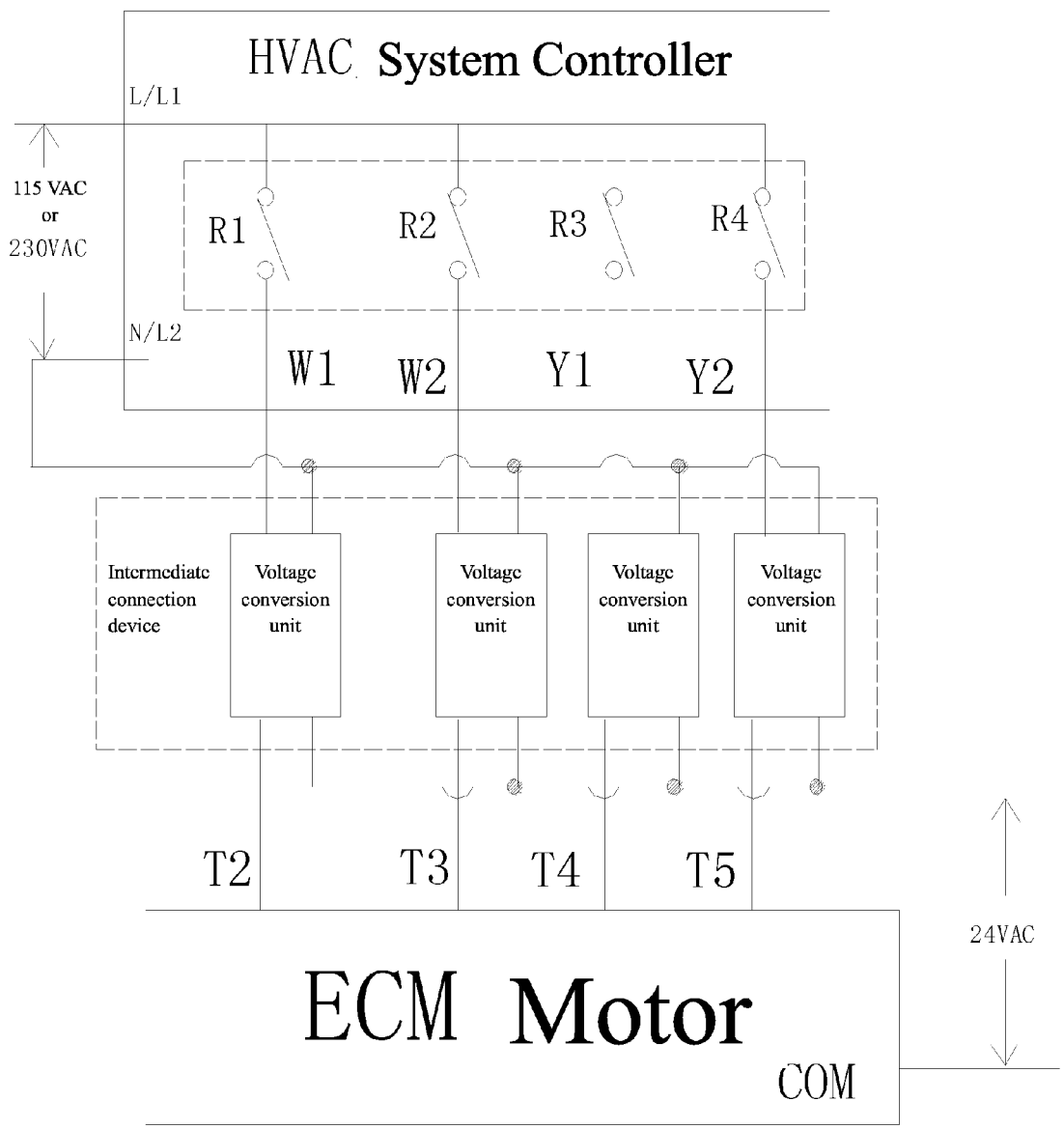
FIG. 2 is a schematic block diagram illustrating the system principle according to one embodiment of the disclosure.

One embodiment of an HVAC system is shown in FIG. 2. The HVAC system, which previously used a PSC fan motor, includes an HVAC system controller and an ECM motor, which has been used to replace the PSC fan motor. The HVAC system controller may include several output ports W1, W2, Y1 and Y2 connected to the motor and two AC input ports L/L1 and N\L2, wherein one AC input port L/L1 may be connected to the output ports W1, W2, Y1 and Y2, respectively, via several relays R1, R2, R3 and R4 in the HVAC system. The several relays R1, R2, R3 and R4 may be controlled such that one of the several output ports W1, W2, Y1 and Y2 may allow 115 V or 230 V AC signals to pass. The ECM motor may be provided with several tap input lines in which only one of the tap input lines is selected to be in the on state, and the remaining lines are selected to be in the off state without electricity. The ECM motor may select an operational parameter for the motor based on the tap input line that is selected to be in the on state. In addition, the ECM motor may control the motor to run according to the selected operational parameter. The tap input lines may be switched on using 24 V low-voltage AC signals. The HVAC system may include an intermediate connection device that may be connected between the HVAC system controller and the ECM motor. The intermediate connection device may convert the 115 V or 230 V AC signals at the several output ports of the HVAC system controller to the 24 V low-voltage AC signals that can be identified by the several tap input lines of the ECM motor. The intermediate connection device may be installed with several voltage conversion units, in which the voltage conversion units convert the 115 V or 230 V AC signals at the several output ports of the HVAC system controller to the 24 V low-voltage AC signals that can be identified by the several tap input lines of the ECM motor.

Figure 3:
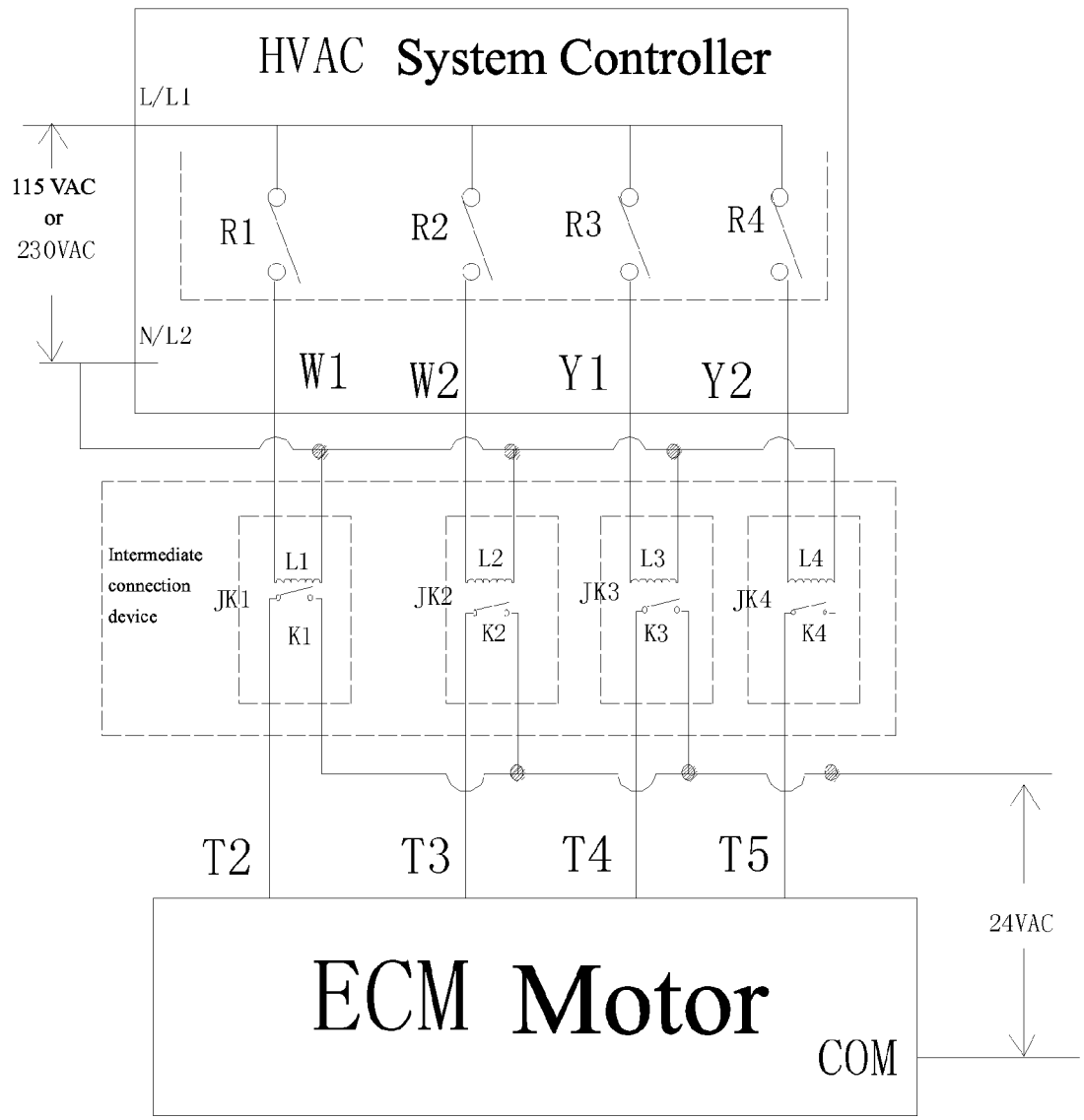
FIG. 3 is a schematic block diagram illustrating a further detailed block diagram of the circuit in FIG. 2 according to one embodiment of the disclosure.

As shown in FIG. 3, the intermediate connection device may include four relays JK1, JK2, JK3, and JK4. In some embodiments, induction coils L1, L2, L3, and L4, and switches K1, K2, K3, and k4 may be installed in the 4 relays JK1, JK2, JK3, and JK4, respectively. In one embodiment, one wiring terminal of the induction coil of each relay may be connected to one of the several output ports W1, W2, Y1 and Y2, and the other wiring terminal of the induction coil of each relay may be connected in parallel for connection with the other AC input port N/L2 of the HVAC system. According to an embodiment, one wiring terminal of the switch of each relay may be connected to one tap input line of the ECM motor, and the other wiring terminal of the switch of each relay may be connected in parallel for connection with the 24 V low-voltage AC signals. The ECM motor may have four tap input lines T2, T3, T4 and T5, and the tap input line T1 may be suspended without connection.

Figure 4:
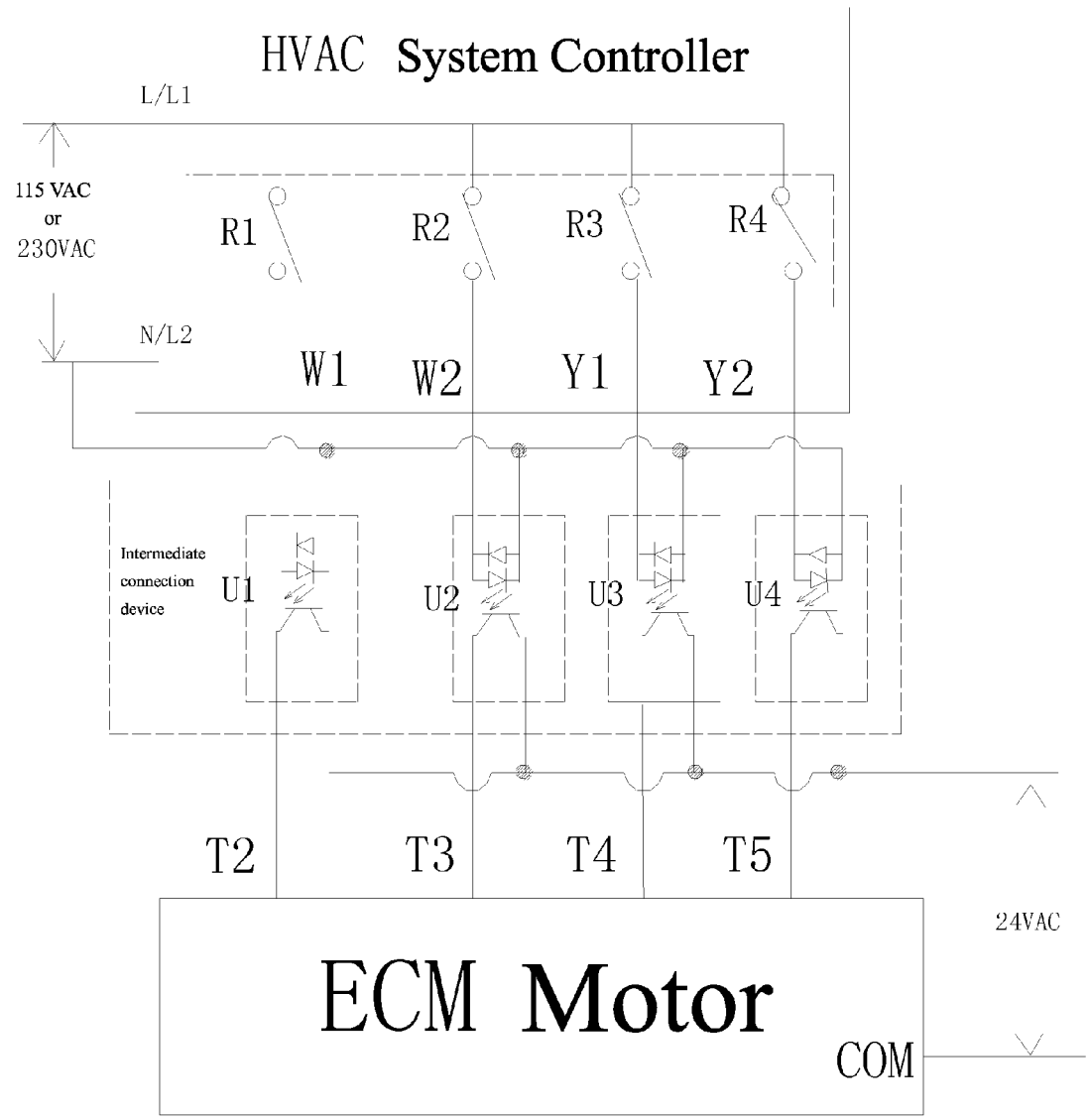
FIG. 4 is a schematic block diagram illustrating another further detailed block diagram of the circuit in FIG. 2 according to one embodiment of the disclosure.
Figure 5:
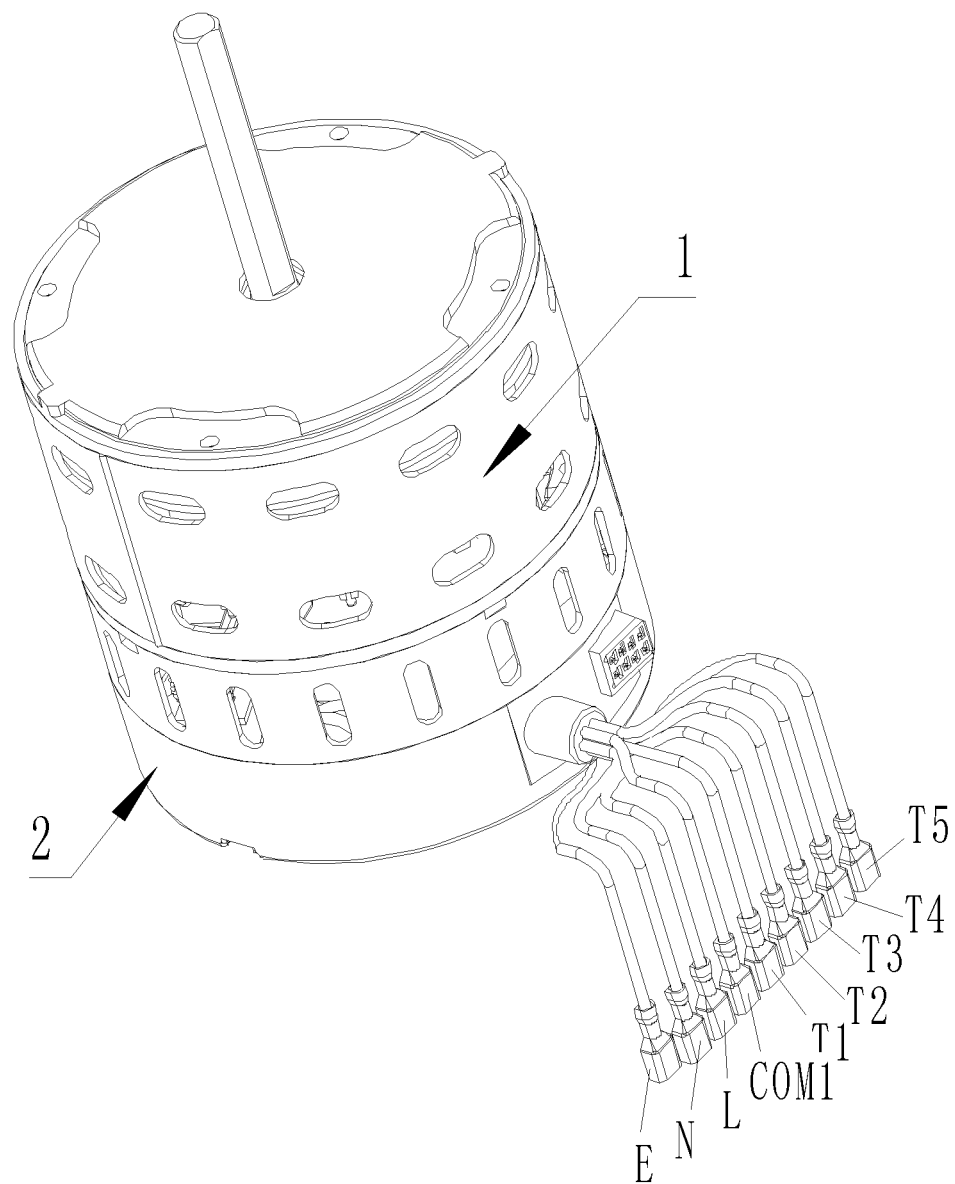
FIG. 5 is a schematic block diagram illustrating a three-dimensional view of the ECM motor according to one embodiment of the disclosure.
Figure 6:
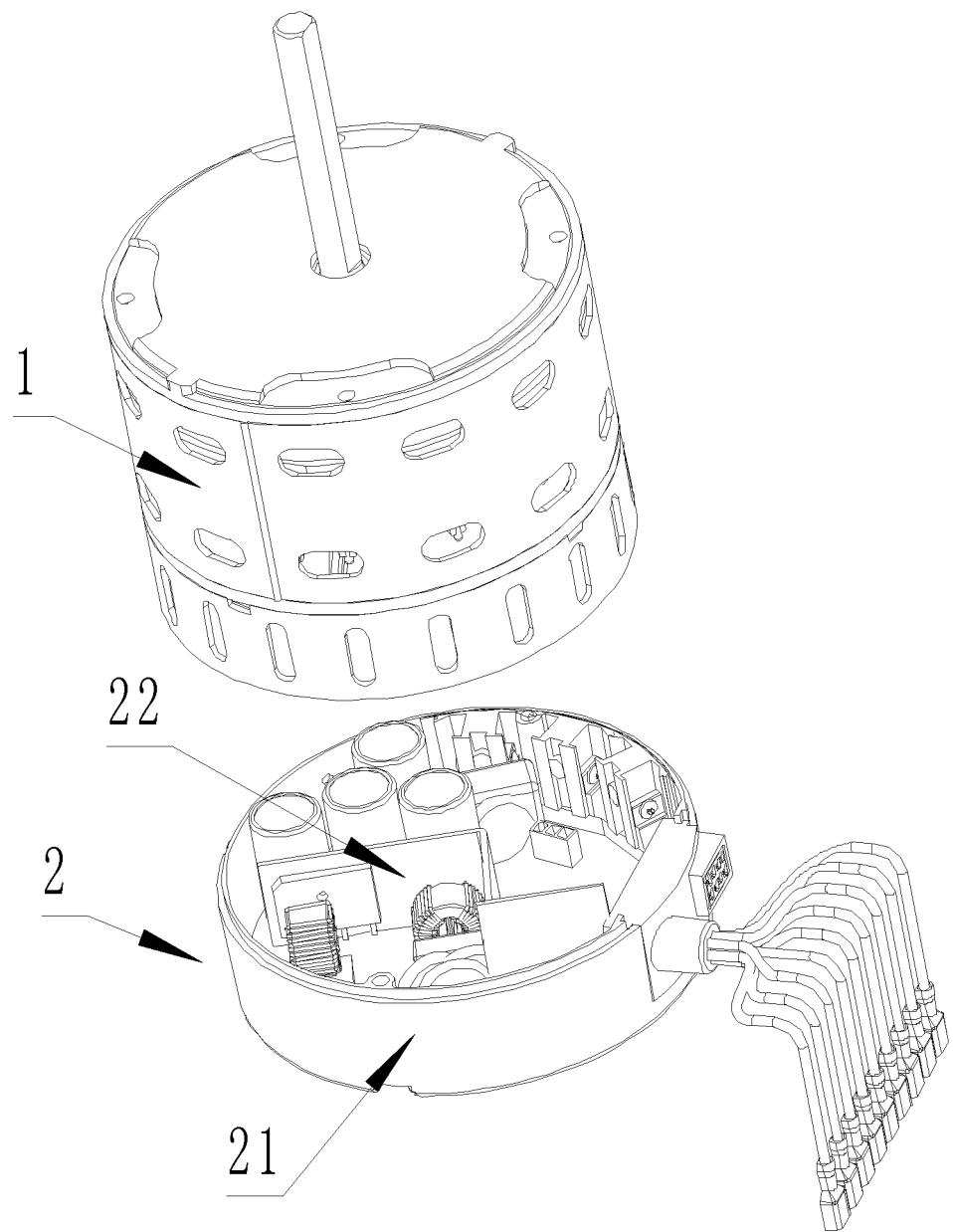
FIG. 6 is a schematic block diagram illustrating an exploded view of the ECM motor according to one embodiment of the disclosure.
Figure 7:
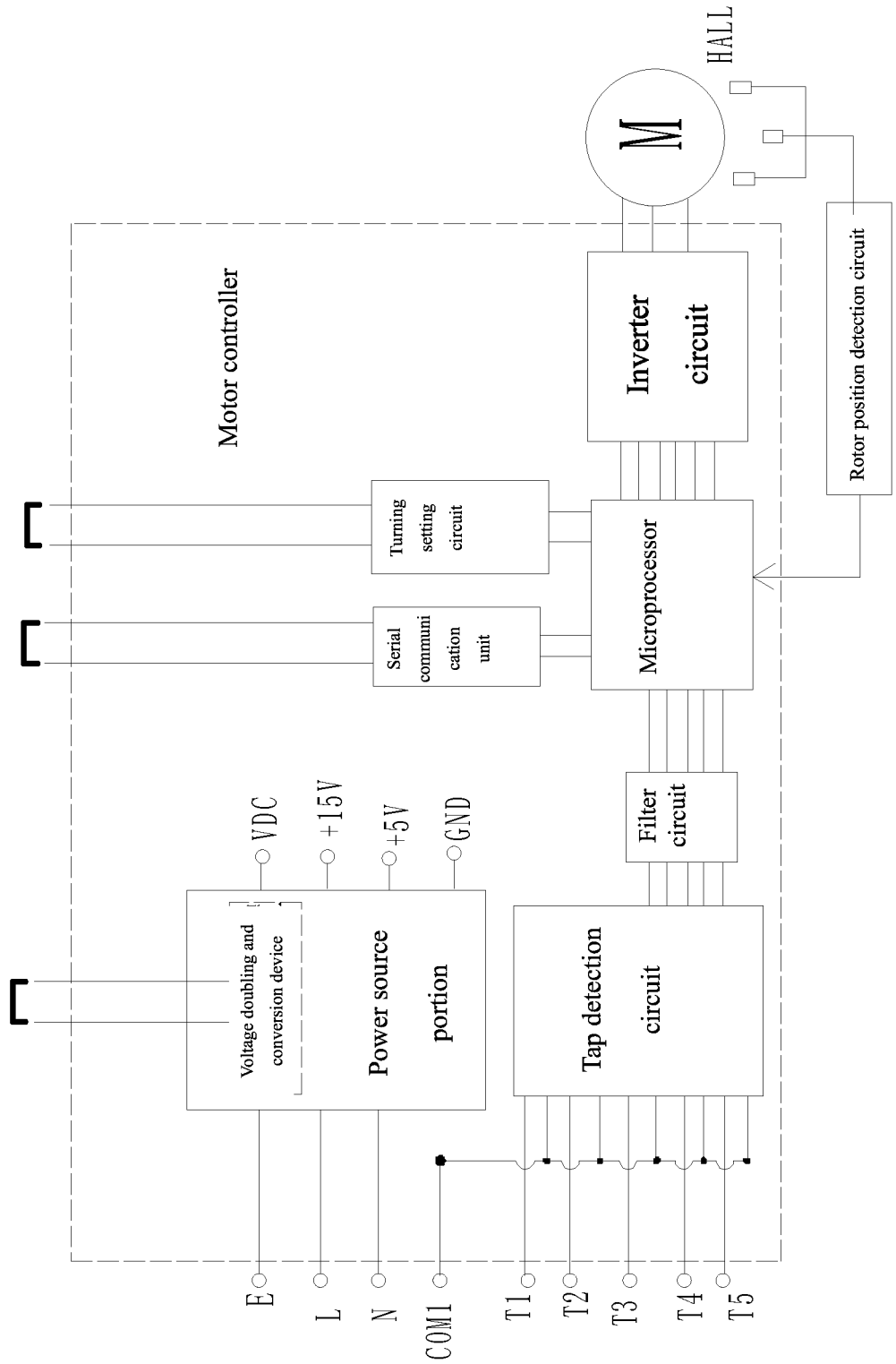
FIG. 7 is a schematic block diagram illustrating a circuit according to one embodiment of the disclosure.
Figure 8:
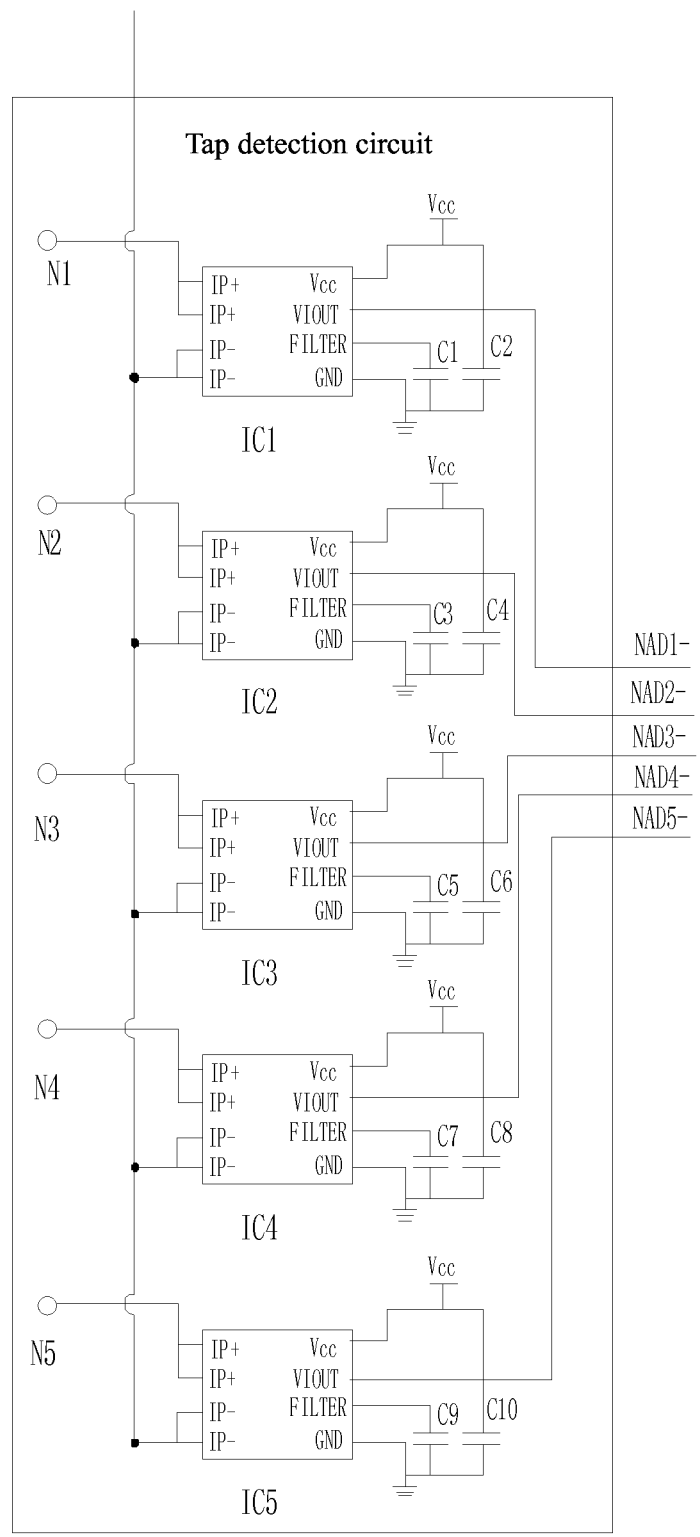
FIG. 8 is a schematic block diagram illustrating a detailed circuit diagram of the tap detection circuit according to one embodiment of the disclosure.

As shown in FIG. 4, the intermediate connection device may include a control circuit board that is provided with four opto-coupler isolation units U1, U2, U3 and U4. According to an embodiment, the two input terminals of each opto-coupler isolation unit may be connected to one output port W1, W2, Y1 and Y2 of the HVAC system and the other AC input port N/L2 of the common port COM HVAC system, respectively. One output terminal of each opto-coupler isolation unit may be connected to the 24 V low-voltage AC signals, and the other output of each opto-coupler isolation unit may be connected to one tap input of the ECM motor. The ECM motor may have four tap input lines T2, T3, T4 and T5, and the tap input line T1 may be suspended without connection.

As shown in FIGS. 5-8, a multi-function ECM motor may include a motor 1 and a motor controller 2. According to an embodiment, the motor controller 2 may include a control box 21 and a control circuit board 22 installed in the control box 21. The control circuit board 22 may be integrated with a microprocessor, an inverter circuit, a tap detection circuit, a rotor position detection circuit, and a power source portion. The power source portion may be connected to an external AC power source input, and the output terminal of the power source portion may supply power to all circuits. The rotor position detection circuit may detect the rotor position signal of the motor through a HALL element and may send the signal to the microprocessor. The microprocessor may control the motor to run through the inverter circuit. The tap detection circuit may be connected to five tap input lines T1, T2, T3, T4, and T5. In some embodiments, only one tap input line may be selected to be in the on state, and the remaining lines may be selected to be in the off state without electricity. The ECM motor may also include a first AC input wire N, a second AC input wire L, a common wire COM1, and a ground wire E. According to an embodiment, the tap detection circuit may include several current sensing units. Each tap input line may be connected to the first input terminal of a respective current sensing unit, and the output terminal of the current sensing unit may be connected to a respective input terminal of the microprocessor. The microprocessor may select an operational parameter for the motor based on the detected on state signal of each tap input line and may control the motor to run according to the selected operational parameter. The current sensing unit may be a HALL current sensor chip that is commercially available. According to an embodiment, the several tap input lines may be five tap input lines T1, T2, T3, T4, and T5, or just three tap input lines T1, T2, and T3. In some embodiments, the operational parameter may be a rotational speed or force moment. The output terminal of the tap detection circuit may be connected to the microprocessor via a filter circuit.

In some embodiments, when the ECM motor is used to replace a PSC motor used in a corresponding HVAC system on the market, four tap input lines T2, T3, T4, and T5 may be connected to four output ports W1, W2, Y1, and Y2, respectively, of the HVAC system controller via the intermediate connection device, and the tap input line T1 may be suspended without connection. A 24 V low-voltage AC signal may be introduced to one of the several tap input lines T2, T3, T4, and T5 of the ECM motor to close the circuit loop and allow current to flow out of the common wire COM1.

Example 2

Figure 9:
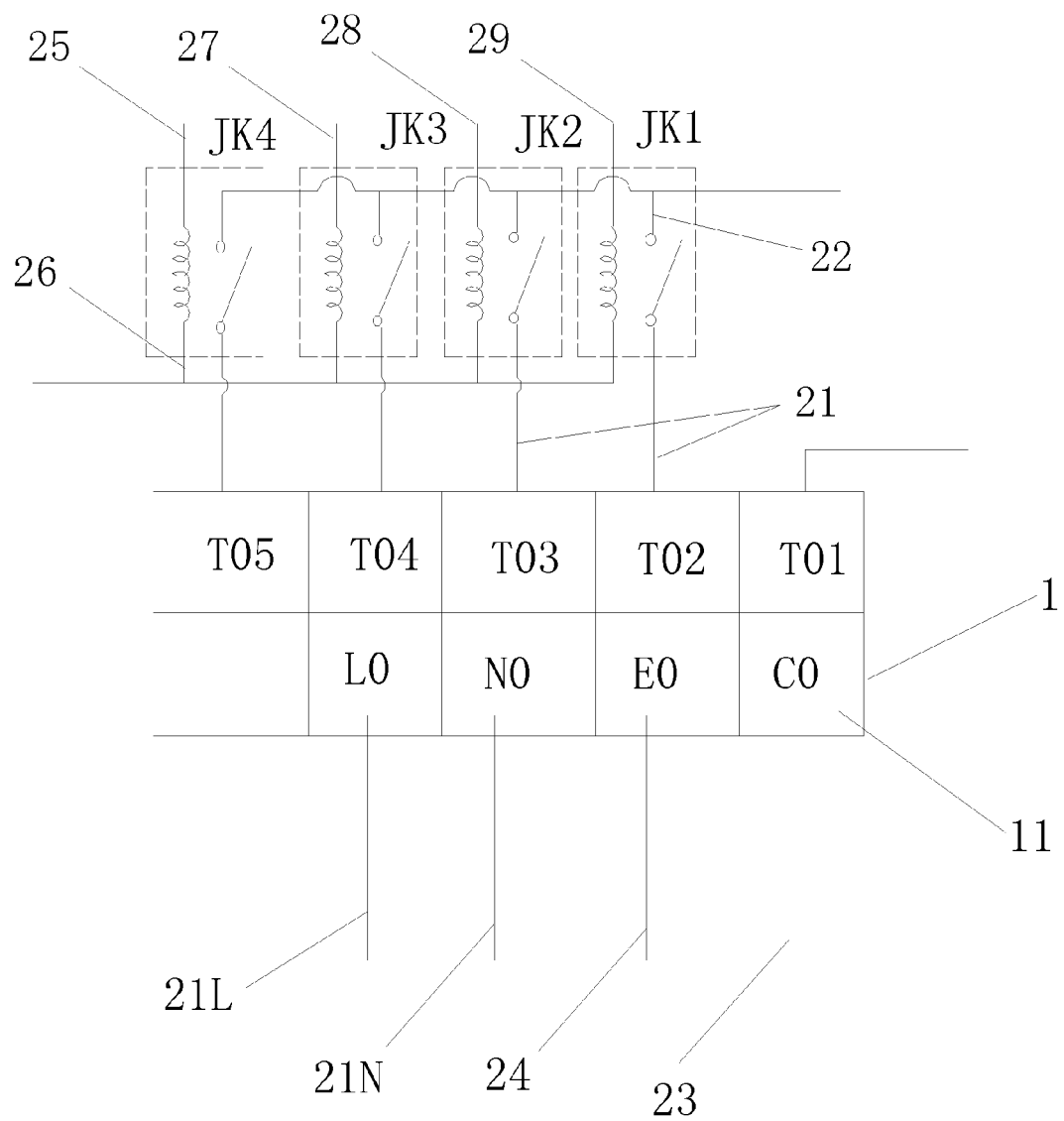
FIG. 9 is a schematic block diagram illustrating a detailed circuit diagram of the intermediate connection device according to one embodiment of the disclosure.
Figure 10:
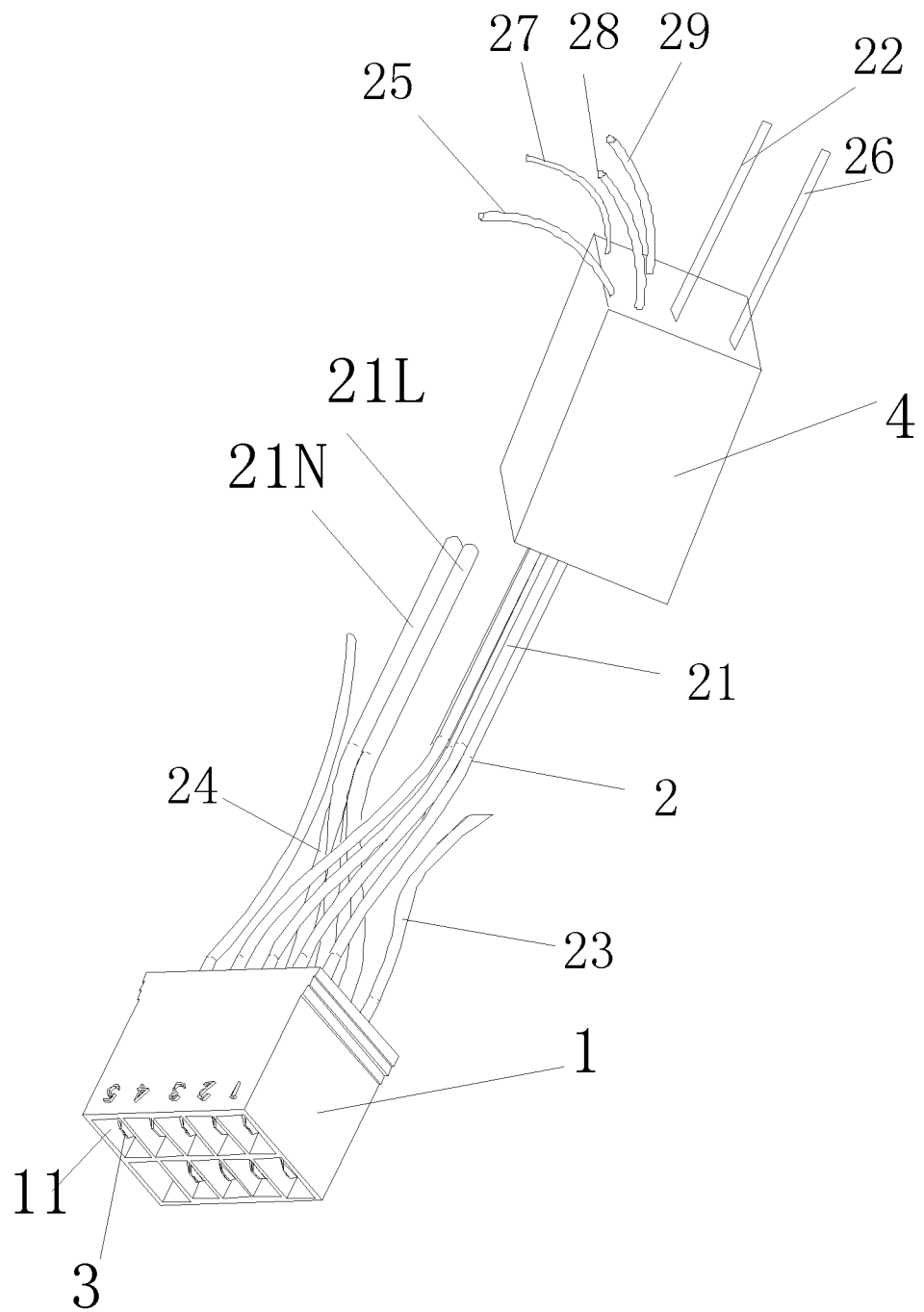
FIG. 10 is a schematic block diagram illustrating the structure of the intermediate connection device according to one embodiment of the disclosure.

As shown in FIGS. 9-10, the intermediate connection device for the HVAC system may include a connection socket 1, connection wires 2, connection terminals 3 and several relays 4. The connection wires 2 may include power source wires 21L and 21N, relay first connection wires 21, relay second connection wires 22, a 24 V AC power source wire 23, and a ground wire 24. The connection socket 1 may be provided with several plug holes 11 thereon. Wiring terminals 3 may be installed in the plug holes 11. Some of the wiring terminals 3 may be connected to the power source wires 21L and 21N, respectively, and some of the wiring terminals 3 may be connected to one end of the first connection wire 21 of the relay 4. The other end of the relay first connection wire 21 may be connected to one wiring terminal of the switch of the relay 4, and the other wiring terminal of the switch of the relay may be connected to one end of the relay second connection wire 22. One wiring terminal 3 may be connected to one end of the 24 V AC power source wire 23, and one wiring terminal 3 may be connected to one end of the ground wire 24. The connection wires may also include relay third connection wires 25, 27, 28, and 29, and a relay fourth connection wire 26. One end of the relay third connection wires 25, 27, 28, and 29 may be connected to one wiring terminal of the induction coil of the relay, and one end of the relay fourth connection wire 26 may be connected to another wiring terminal of the induction coil of the relay. The connection socket 1 may have a structure of two rows, upper and lower, of plug holes 11, and each row may have five plug holes 11. Several relays 4 may mean four relays. For example, in some embodiments, there may be four relay first connection wires 21, four relay second connection wires 22, and 2 power source wires.

As shown in FIG. 9, assume that nine wiring terminals are installed in the plug holes 11, which are labelled as T01, T02, T03, T04, T05, L0, N0, E0, and C0, respectively. In some embodiments, the terminal T01 may be led out by a connection wire 2 that is suspended without connection. The terminals T02, T03, T04 and T5 may be connected to four relay first connection wires 21, respectively. The terminals L0 and N0 may be connected to the power source wires 21L and 21N, respectively. The terminal E0 may be connected to the ground wire 24, and the terminal C0 may be connected to the 24 V AC power source wire 23. The five tap input lines T1, T2, T3, T4, and T5, the second AC input wire L, the first AC input wire N, the common wire COM1, and a ground wire E of the ECM motor may be electrically connected to the 9 wiring terminals installed in the plug holes 11, T01, T02, T03, T04, T05, L0, N0, E0, and C0, respectively.

Example 3

Figure 11:
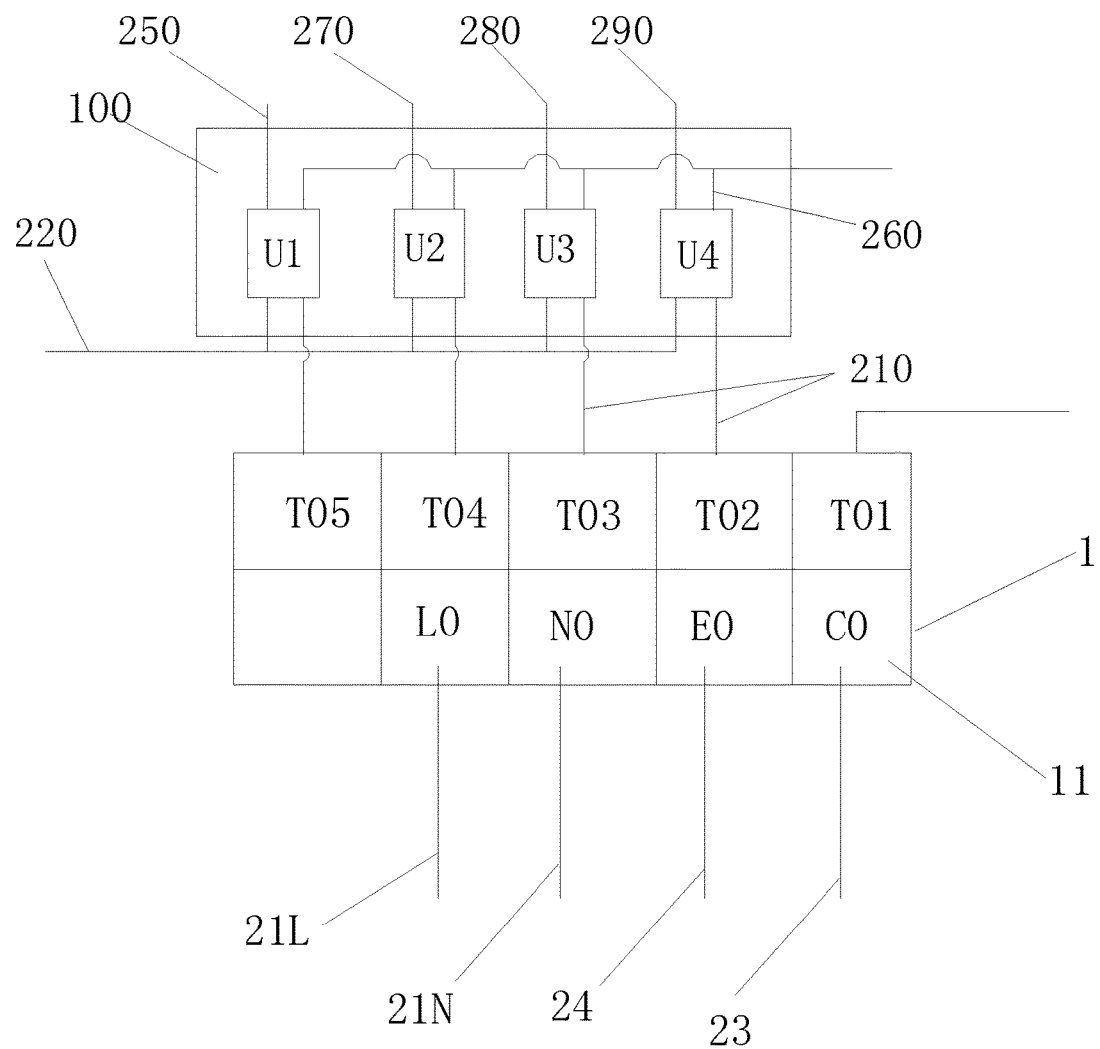
FIG. 11 is a schematic block diagram illustrating another detailed circuit diagram of the intermediate connection device according to one embodiment of the disclosure.
Figure 12:
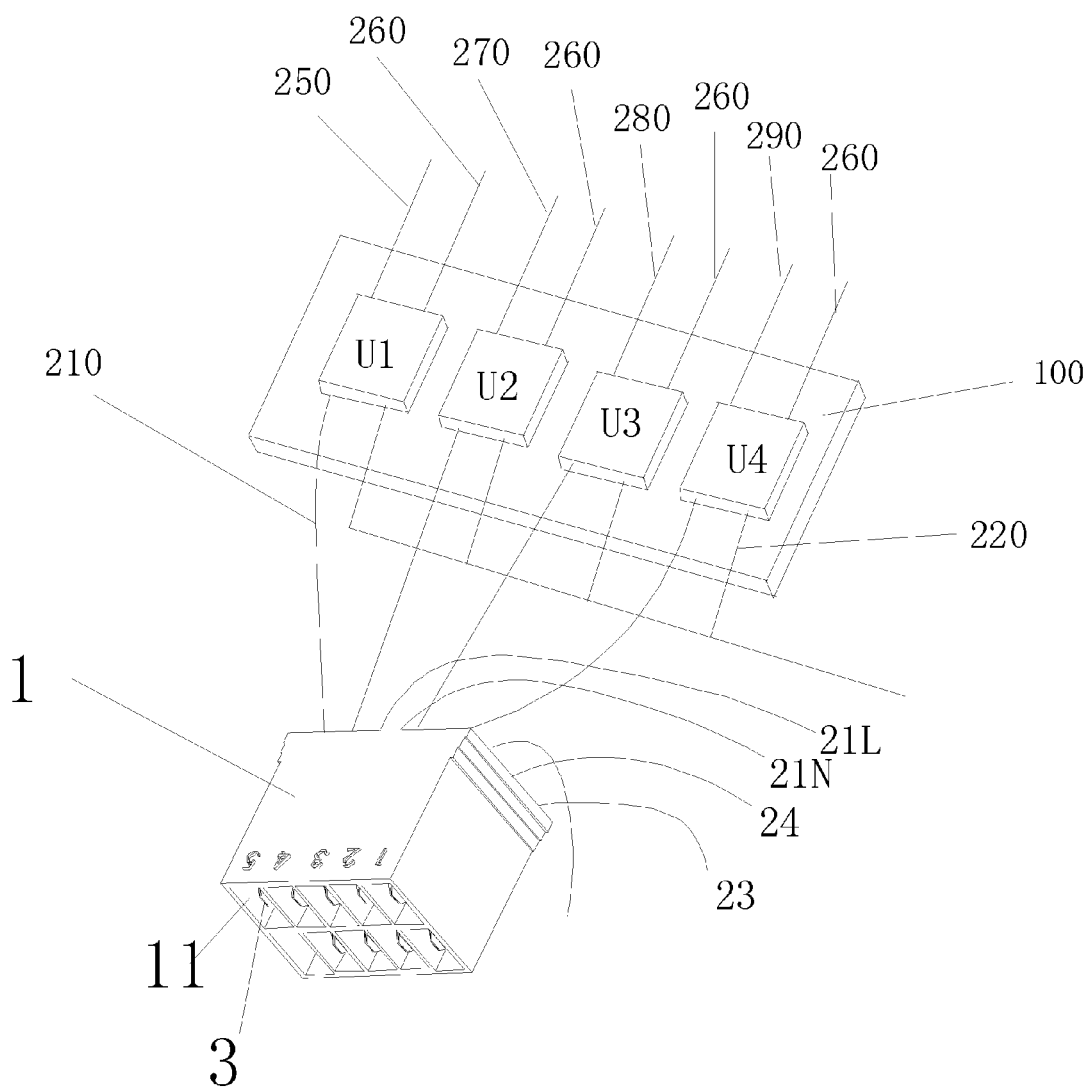
FIG. 12 is a schematic block diagram illustrating another structure of the intermediate connection device according to one embodiment of the disclosure.

As shown in FIGS. 11-12, the intermediate connection device for the HVAC system may include a connection socket 1, connection wires 2, connection terminals 3, and a control circuit board 100. The control circuit board 100 may be provided with several opto-coupler isolation units U1, U2, U3, and U4. The connection wires 2 may include power source wires 21L and 21N, an opto-coupler first connection wire 210, an opto-coupler second connection wire 220, a 24 V AC power source wire 23, and a ground wire 24. The connection socket 1 may be provided with several plug holes 11 thereon. In some embodiments, wiring terminals 2 may be installed in the plug holes 11. Some of the wiring terminals 2 may be connected to the power source wires 21L and 21N, respectively, and some of the wiring terminals 2 may be connected to one end of the opto-coupler first connection wire 210. The other end of the opto-coupler first connection wire 210 may be connected to one output terminal of the opto-coupler isolation unit. The other output terminal of the opto-coupler isolation unit may be connected to one end of the opto-coupler second connection wire 220. One wiring terminal 3 may be connected to one end of the 24 V AC power source wire 23, and one wiring terminal 3 may be connected to one end of the ground wire 24. The connection wires 2 may also include opto-coupler third connection wires 250, 270, 280, and 290, and a opto-coupler fourth connection wire 260. One end of the opto-coupler third connection wires 250, 270, 280, and 290 may be connected to one input terminal of the opto-coupler isolation unit, and one end of the opto-coupler fourth connection wire 260 may be connected to another input terminal of the opto-coupler isolation unit. The connection socket 1 may have a structure of two rows, upper and lower, of plug holes 11 and each row may have five plug holes. Several opto-coupler isolation units may refer to four opto-coupler isolation units. For example, in some embodiments, there may be four opto-coupler first connection wires 210, four opto-coupler second connection wires 220, and two power source wires.

As shown in FIG. 11, in one embodiment, nine wiring terminals 3 may be installed in the plug holes 11, which are labeled as T01, T02, T03, T04, T05, L0, N0, E0, and C0, respectively. The terminal T01 may be led out by a connection wire 2 that may be suspended without connection. The terminals T02, T03, T04, and T05 may be connected to four opto-coupler first connection wires 210, respectively. The terminals L0 and N0 may be connected to the power source wires 21L and 21N, respectively. The terminal E0 may be connected to the ground wire 24 and the terminal C0 may be connected to the 24 V AC power source wire 23. The five tap input lines T1, T2, T3, T4, and T5, the second AC input wire L, the first AC input wire N, a common wire COM1, and a ground wire E of the ECM motor may be electrically connected to the nine wiring terminals installed in the plug holes 11, T01, T02, T03, T04, T05, L0, N0, E0, and C0, respectively.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus for interfacing a permanent magnet (PM) motor with a Heating, Ventilation, and Air Conditioning (HVAC) system, comprising:
  an intermediate connection device configured to:
    receive a first electrical signal at a first input terminal of a plurality of voltage conversion units of the intermediate connection device;
    receive a second electrical signal from a system controller via a system controller relay, wherein the second electrical signal is received at a second input terminal of a voltage conversion unit of the intermediate connection device, and wherein the voltage conversion unit of the intermediate connection device is one of the plurality of voltage conversion units of the intermediate connection device;
    convert the voltage across the first and second input terminals of the voltage conversion unit of the intermediate connection device to a voltage signal that has a lower value than the voltage across the first and second terminals of the voltage conversion unit of the intermediate connection device; and
    transmit the voltage signal to one of a plurality of inputs of the PM motor, wherein the transmitted voltage signal causes the motor to operate in one of a plurality of operation modes.

2. The apparatus of claim 1, wherein the one of a plurality of operation modes corresponds to an input received at the system controller.

3. The apparatus of claim 1, wherein the plurality of voltage conversion units of the intermediate connection device are each coupled to distinct outputs of the system controller.

4. The apparatus of claim 1, wherein the voltage conversion unit of the intermediate connection device comprises an induction coil as a triggering component.

5. The apparatus of claim 1, wherein the voltage conversion unit of the intermediate connection device comprises an opto-coupler isolation unit as a triggering component.

6. The apparatus of claim 1, wherein the intermediate connection device is configured to couple to only the PM motor and the system controller, and is configured to not couple to a thermostat.

7. A method for interfacing a permanent magnet (PM) motor with a system controller of a Heating, Ventilation, and Air Conditioning (HVAC) system, comprising:
  receiving, at an intermediate connection device, a first electrical signal, wherein the first electrical signal is received at a first input terminal of a plurality of voltage conversion units of the intermediate connection device;
  receiving, at the intermediate connection device, a second electrical signal from a system controller via a system controller relay, wherein the second electrical signal is received at a second input terminal of a voltage conversion unit of the intermediate connection device, and wherein the voltage conversion unit of the intermediate connection device is one of the plurality of voltage conversion units of the intermediate connection device;
  converting, at the intermediate connection device, the voltage across the first and second input terminals of the voltage conversion unit of the intermediate connection device to a voltage signal that has a lower value than the voltage across the first and second terminals of the voltage conversion unit of the intermediate connection device; and transmitting, at the intermediate connection device, the voltage signal to one of a plurality of inputs of the PM motor, wherein the transmitted voltage signal causes the motor to operate in one of a plurality of operation modes.

8. The method of claim 7, wherein the one of a plurality of operation modes corresponds to an input received at the system controller.

9. The method of claim 7, wherein the plurality of voltage conversion units of the intermediate connection device are each coupled to distinct outputs of the system controller.

10. The method of claim 7, wherein the voltage conversion unit of the intermediate connection device comprises an induction coil as a triggering component.

11. The method of claim 7, wherein the voltage conversion unit of the intermediate connection device comprises an opto-coupler isolation unit as a triggering component.

12. The method of claim 7, wherein the intermediate connection device is coupled to only the PM motor and the system controller, and is not coupled to a thermostat.

13. A control system for a permanent magnet (PM) motor in a Heating, Ventilation, and Air Conditioning (HVAC) system, comprising:
  a tap detection circuit configured to be coupled to an intermediate connection device that is coupled to a system controller of the HVAC system, wherein the tap detection circuit comprises a plurality of input ports and a plurality of output ports and is configured to:
    receive, at an input port, a voltage signal from the intermediate connection device, wherein the voltage signal is associated with a higher voltage signal transmitted by the system controller to the intermediate connection device;
    detect which input port of the plurality of input ports received the voltage signal; and
    transmit, via an output port associated with the detected input port, a signal to a processor; and
  the processor, wherein the processor is coupled to the tap detection circuit, and wherein the processor is configured to:
    receive the signal transmitted from the output port associated with the detected input port; and
    select one of a plurality of operation modes in which to operate the motor based, at least in part, on the received signal.

14. The control system of claim 13, wherein each input port of the tap detection circuit is configured to couple to a distinct voltage conversion unit of the intermediate connection device.

15. The control system of claim 13, wherein the tap detection circuit comprises a current sensor to sense current flowing through the input port at which the voltage signal was received.

16. The control system of claim 13, wherein the tap detection circuit comprises a plurality of current sensors, and wherein each current sensor associates an output port of the tap detection circuit with an input port.

17. The control system of claim 13, wherein the processor is further configured to instruct the motor to operate in the operation mode.

18. The control system of claim 13, wherein the intermediate connection device is configured to couple to only the tap detection circuit of the PM motor and the system controller, and is configured to not couple to a thermostat.

19. A method for controlling a permanent magnet (PM) motor in a Heating, Ventilation, and Air Conditioning (HVAC) system, comprising:
  receiving, at an input port of a plurality of input ports of the PM motor, a voltage signal from an intermediate connection device that is coupled to a system controller of the HVAC system, wherein the voltage signal is associated with a higher voltage signal transmitted by the system controller to the intermediate connection device;
  detecting, with a tap detection circuit of the PM motor, which input port of the plurality of input ports received the voltage signal; and
  selecting, with a processor of the PM motor, one of a plurality of operation modes in which to operate the motor based, at least in part, on the detection of which input port of the plurality of input ports received the voltage signal.

20. The method of claim 19, wherein each input port of the PM motor is configured to couple to a distinct voltage conversion unit of the intermediate connection device.

21. The method of claim 19, wherein the tap detection circuit comprises a current sensor to sense current flowing through the input port at which the voltage signal was received.

22. The method of claim 19, wherein the tap detection circuit comprises a plurality of current sensors, and wherein each current sensor associates an output port of the tap detection circuit with an input port of the PM motor.

23. The method of claim 19, further comprising instructing the motor to operate in the operation mode.

24. The method of claim 19, wherein the intermediate connection device is coupled to only the PM motor and the system controller, and is not coupled to a thermostat.

* * * * *